US010598158B2

(12) United States Patent
Davidson et al.

(10) Patent No.: US 10,598,158 B2
(45) Date of Patent: Mar. 24, 2020

(54) SYSTEM AND METHOD FOR REMOVING OR INSTALLING ROTOR BLADE HARDWARE OF A WIND TURBINE

(71) Applicant: General Electric Company, Schenectady, NY (US)

(72) Inventors: Paul Howard Davidson, Albany, NY (US); Stephanie Lohberg Willman, Easley, SC (US); Santiago Murcia, Greenville, SC (US); Joshua Adam Klinghagen, Kokomo, IN (US); Gregory Clarence Thomas, Saratoga Springs, NY (US); Michael Royce Johnson, Campton, NH (US); Don Conrad Johnson, Simpsonville, SC (US); Ulrich Werner Neumann, Simpsonville, SC (US); Adam Sean Davis, Red Feather Lakes, CO (US); Dean Thomas Roney, Middleburgh, NY (US); Kathleen Lynne Bentzel, Acworth, GA (US)

(73) Assignee: General Electric Company, Schenectady, NY (US)

( * ) Notice: Subject to any disclaimer, the term of this patent is extended or adjusted under 35 U.S.C. 154(b) by 99 days.

(21) Appl. No.: 15/654,833

(22) Filed: Jul. 20, 2017

(65) Prior Publication Data

US 2019/0024639 A1  Jan. 24, 2019

(51) Int. Cl.
*F03D 80/50* (2016.01)
*F03D 80/70* (2016.01)
(Continued)

(52) U.S. Cl.
CPC ............. *F03D 80/50* (2016.05); *B25J 11/005* (2013.01); *B25J 15/0019* (2013.01);
(Continued)

(58) Field of Classification Search
CPC .................... B23P 19/06; F05B 2230/60; F05B 2230/604; F05B 2230/70; F05B 2230/80;
(Continued)

(56) References Cited

U.S. PATENT DOCUMENTS

2009/0324380 A1   12/2009   Pedersen
2013/0289769 A1   10/2013   Park et al.
(Continued)

FOREIGN PATENT DOCUMENTS

DK   201400575 A1   4/2016
EP   3 091 222 A1   11/2016
(Continued)

OTHER PUBLICATIONS

Extended European Search Report and Opinion issued in connection with corresponding EP Application No. 18184398.8 dated Dec. 13, 2018.

*Primary Examiner* — Christopher J Besler
(74) *Attorney, Agent, or Firm* — Dority & Manning, P.A.

(57) ABSTRACT

A method for detaching or installing a rotor blade from or to a hub of a wind turbine includes positioning the rotor blade toward a ground location between a three o'clock position and a nine o'clock position. The method also includes mounting a mechanical arm to an uptower location of the wind turbine. Further, the mechanical arm includes a torqueing tool at a distal end thereof. Thus, the method also includes removing or installing, via the torqueing tool, each of the plurality of hub fasteners so as to detach or attach the rotor blade from or to the hub.

11 Claims, 10 Drawing Sheets

(51) Int. Cl.
  *F03D 13/20* (2016.01)
  *F03D 13/10* (2016.01)
  *B25J 11/00* (2006.01)
  *B25J 15/00* (2006.01)
  *B25J 15/02* (2006.01)
  *F03D 1/06* (2006.01)

(52) U.S. Cl.
  CPC ......... *B25J 15/0095* (2013.01); *B25J 15/022* (2013.01); *F03D 1/0658* (2013.01); *F03D 13/10* (2016.05); *F03D 13/20* (2016.05); *F03D 80/70* (2016.05); *F05B 2230/60* (2013.01); *F05B 2230/70* (2013.01); *F05B 2230/80* (2013.01); *F05B 2240/221* (2013.01); *F05B 2260/507* (2013.01); *F05B 2270/604* (2013.01); *F05B 2270/606* (2013.01)

(58) Field of Classification Search
  CPC ............ F05B 2240/90; F05B 2240/912; F03D 80/50; F03D 13/10; F03D 13/20; B25J 11/005; B25J 11/0055
  See application file for complete search history.

(56) References Cited

U.S. PATENT DOCUMENTS

2013/0318789 A1\* 12/2013 Gabeiras .................. B21K 3/04
                                                  29/889.7
2013/0340256 A1\* 12/2013 Tsuchitani ............ F16C 35/062
                                                  29/898.06
2014/0350724 A1   11/2014 Johst et al.

FOREIGN PATENT DOCUMENTS

EP          3 163 071 A1    5/2017
WO       2009/128708 A2    10/2009
WO       2012/093245 A1    7/2012

\* cited by examiner

SYSTEM AND METHOD FOR REMOVING OR INSTALLING ROTOR BLADE HARDWARE OF A WIND TURBINE

FIELD OF THE INVENTION

The present disclosure relates generally to wind turbines, and more particularly to systems and methods for removing or installed rotor blade hardware of a wind turbine in difficult-to-access locations.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Typically, to initially install a rotor blade onto the wind turbine hub and/or to remove one of the existing rotor blades from the hub, a large crane must be transported to the wind turbine site in order to provide a means for raising and/or lowering the rotor blade relative to the hub. However, the process for removing and assembling the hardware associated with attaching the rotor blade to the hub when the hardware is located outside of the hub, as well as physical access to the hardware, is difficult. More specifically, oftentimes, the hardware is typically difficult to access uptower by personnel in a safe manner. In addition, even if accessible, there are often tight clearances between the hardware to be removed and the uptower blade components, making it difficult to use standard tooling.

Accordingly, improved methods and related systems for removing and/or installing rotor blade hardware from and to the hub that addresses the aforementioned issues would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for detaching or installing a rotor blade from or to a hub of a wind turbine. The method includes positioning the rotor blade toward a ground location between a three o'clock position and a nine o'clock position. The method also includes mounting a mechanical arm to an uptower location of the wind turbine. Further, the mechanical arm includes a torqueing tool at a distal end thereof. Thus, the method also includes removing or installing, via the torqueing tool, a plurality of hub fasteners (e.g. bolts, nuts, washers, fasteners, and similar) so as to detach or attach the rotor blade from or to the hub.

In one embodiment, the method further includes removing, via the torqueing tool, each of the plurality of hub fasteners so as to detach the rotor blade from the hub with a pitch bearing attached thereto via a plurality of blade bolts.

In another embodiment, the method may include positioning the rotor blade in a substantially six o'clock position.

In several embodiments, the uptower location may include a blade root of the rotor blade, the hub, a pitch bearing, an external support structure (e.g. a platform) mounted uptower, or any other suitable uptower structure.

In further embodiments, the method may include locating each of the plurality of hub fasteners via the mechanical arm and torqueing each of the plurality of hub fasteners via the mechanical arm so as to loosen or tighten the rotor blade from the hub based on whether the rotor blade is being detached or installed to the hub.

In additional embodiments, the method may further include storing the plurality of hub fasteners in a storage system configured with the torqueing tool after removal.

In particular embodiments, the torqueing tool may be designed with a maximum height and/or diameter so as to ensure that the torqueing tool can fit in predetermined clearances uptower.

In further embodiments, the method may include removing, via a material removal device, a portion of the rotor blade at the blade root to create space for the torqueing tool. More specifically, in such embodiments, the step of removing the portion of the rotor blade at the blade root via the material removal device may include mounting the material removal device adjacent to and contacting the portion of the rotor blade to be removed and pitching the rotor blade via an existing pitch system such that rotation of the rotor blade against the material removal device removes the portion of the rotor blade.

Alternatively, the step of removing the portion of the rotor blade at the blade root may include utilizing the material removal device to remove select areas of the blade root. As such, in certain embodiments, the material removal device may be active. In alternative embodiments, the material removal device may be passive.

In further embodiments, the method may also include securing the rotor blade to a tower of the wind turbine at the blade root and a blade tip of the rotor blade during removing or installing of each of the plurality of hub fasteners via at least one of a clamp, a sleeve, one or more support lines, or combinations thereof. More particularly, in certain embodiments, the method may include securing the rotor blade to the tower continuously between the blade root and the blade tip thereof during removing, installing, or storage of each of the plurality of hub fasteners.

In yet another embodiment, the method may include continuously adjusting the mechanical arm to accommodate removal or installation of each of the plurality of hub fasteners. As such, the mechanical arm can be mounted and/or adjusted so as to accommodate rotor blades and pitch bearings of varying sizes.

In another aspect, the present disclosure is directed to a method for detaching or installing a rotor blade from or to a hub of a wind turbine. The method includes positioning the rotor blade in a first position. The method also includes torqueing a first subset of the plurality of hub fasteners while the rotor blade is in the first position. Further, the method includes changing a position of the rotor blade from the first position to a second position, the second position being different than the first position. Moreover, the method includes torqueing a second subset of the plurality of hub fasteners so as to detach or install the rotor blade from the hub. Thus, for removal of the rotor blade, the first and second subsets of the plurality of hub fasteners are also removed after torqueing in a first direction. Alternatively, for installation of the rotor blade, the first and second subsets of the plurality of hub fasteners are installed before torqueing in a second direction. Further, it should be understood that the first and second directions are opposite. The method may further include any of the additional steps and/or features as described herein.

In addition, in one embodiment, the step of torqueing the second subset of the plurality of hub fasteners may include mounting a mechanical arm having a torqueing tool at a distal end thereof to an uptower location of the wind turbine and torqueing, via the torqueing tool, the second subset of the plurality of hub fasteners.

In another embodiment, the first subset of the plurality of hub fasteners may be greater than the second set of the plurality of hub fasteners.

In further embodiments, the first position may include rotor positions ranging from about a nine o'clock position to a twelve o'clock position to about a three o'clock position. As such, when the rotor blade is in the first position, the hub fasteners are generally more accessible than the second position, which includes rotor positions ranging from about a three o'clock position to a six o'clock position to about a nine o'clock position. Thus, when the rotor blade is in the second position, the hub fasteners are more difficult to access than the first position.

In yet another aspect, the present disclosure is directed to a method for detaching or installing a rotor blade from or to a hub of a wind turbine. The method includes positioning the rotor blade toward a ground location between a three o'clock position and a nine o'clock position. The method also includes mounting a mechanical arm to an uptower location of the wind turbine. Further, the method includes securing a support platform to a distal end of the mechanical arm. Another step includes maneuvering the support platform to a location near the plurality of hub fasteners. Thus, the method also includes removing, via a torqueing tool, the plurality of hub fasteners so as to detach the rotor blade from the hub. It should be understood that the method may further include any of the additional steps and/or features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
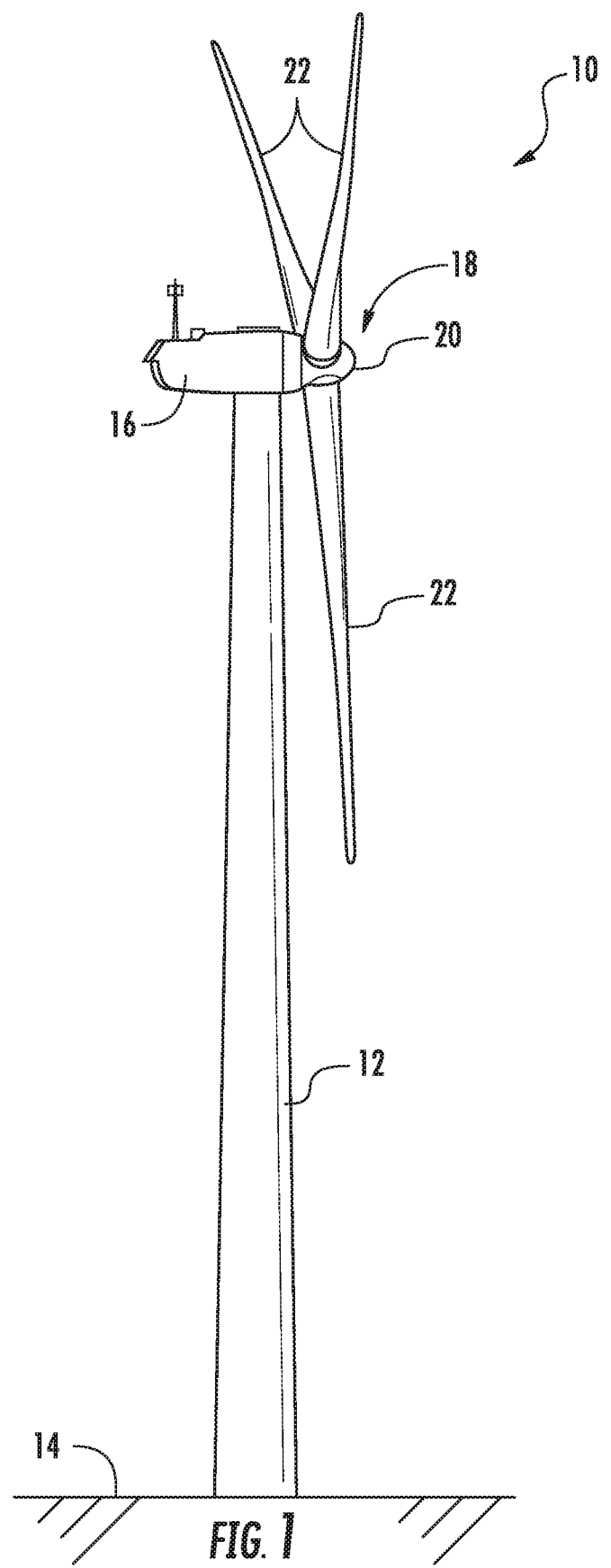
FIG. 1 illustrates a perspective view of a wind turbine according to one embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a side view of one embodiment of a wind turbine 10. As shown, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 19 may include more or less than three rotor blades 22. Each rotor blade 22 may be spaced about the hub 20 to facilitate rotating the rotor 19 to enable kinetic energy to be transferred from the wind into usable mechanical energy, and subsequently, electrical energy. For instance, the hub 20 may be rotatably coupled to an electric generator 25 (FIG. 2) positioned within the nacelle 16 to permit electrical energy to be produced.

Figure 2:
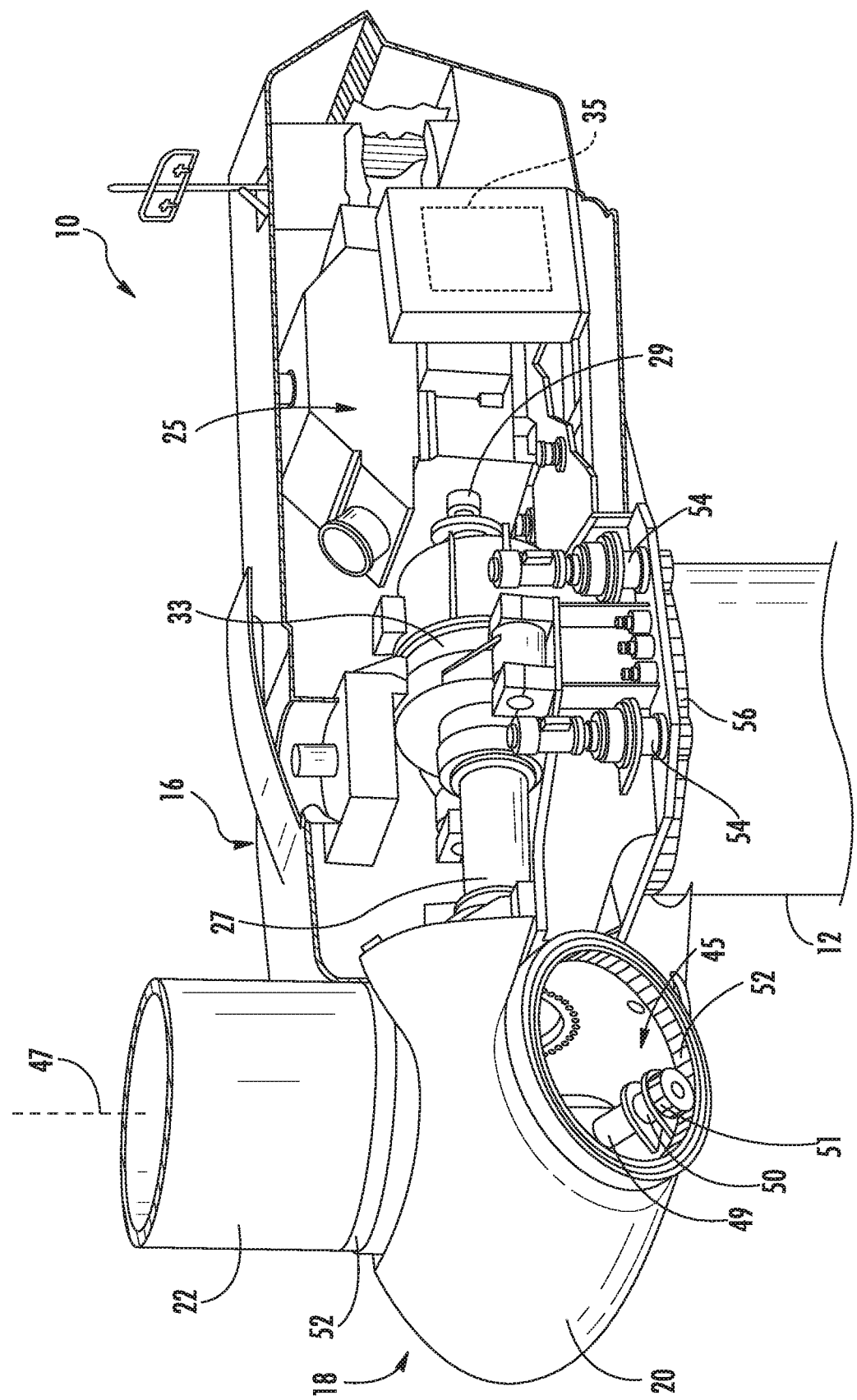
FIG. 2 illustrates a simplified, internal view of one embodiment of a nacelle of a wind turbine according to the present disclosure.

Referring now to FIG. 2, a simplified, internal view of one embodiment of the nacelle 16 of the wind turbine 10 shown in FIG. 1 is illustrated. As shown, the generator 25 may be disposed within the nacelle 16. In general, the generator 25 may be coupled to the rotor 18 for producing electrical power from the rotational energy generated by the rotor 18. For example, as shown in the illustrated embodiment, the rotor 18 may include a rotor shaft 27 coupled to the hub 20 for rotation therewith. The rotor shaft 27 may, in turn, be rotatably coupled to a generator shaft 29 of the generator 25 through a gearbox 33. As is generally understood, the rotor shaft 27 may provide a low speed, high torque input to the gearbox 33 in response to rotation of the rotor blades 22 and the hub 20. The gearbox 33 may then be configured to convert the low speed, high torque input to a high speed, low torque output to drive the generator shaft 29 and, thus, the generator 25.

The wind turbine 10 may also include a controller 35 centralized within the nacelle 16. Alternatively, the controller 35 may be located within any other component of the wind turbine 10 or at a location outside the wind turbine 10. Further, the controller 35 may be communicatively coupled to any number of the components of the wind turbine 10 in order to control the operation of such components and/or implement various correction actions as described herein.

Still referring to FIG. 2, each rotor blade 22 may also include a pitch drive mechanism 45 configured to rotate each rotor blade 22 about its pitch axis 47. Further, each pitch drive mechanism 45 may include a pitch drive motor 49 (e.g., any suitable electric, hydraulic, or pneumatic motor), a pitch drive gearbox 50, and a pitch drive pinion 51. In such embodiments, the pitch drive motor 49 may be coupled to the pitch drive gearbox 50 so that the pitch drive motor 49 imparts mechanical force to the pitch drive gearbox 50. Similarly, the pitch drive gearbox 50 may be coupled to the pitch drive pinion 51 for rotation therewith. The pitch drive pinion 51 may, in turn, be in rotational engagement with a pitch bearing 52 coupled between the hub 20 and a corresponding rotor blade 22 such that rotation of the pitch drive pinion 51 causes rotation of the pitch bearing 52. Thus, in such embodiments, rotation of the pitch drive motor 49 drives the pitch drive gearbox 50 and the pitch drive pinion 51, thereby rotating the pitch bearing 52 and the rotor blade 22 about the pitch axis 47. Similarly, the wind turbine 10 may include one or more yaw drive mechanisms 54 communicatively coupled to the controller 35, with each yaw drive mechanism(s) 54 being configured to change the angle of the nacelle 16 relative to the wind (e.g., by engaging a yaw bearing 56 of the wind turbine 10).

Figure 3:
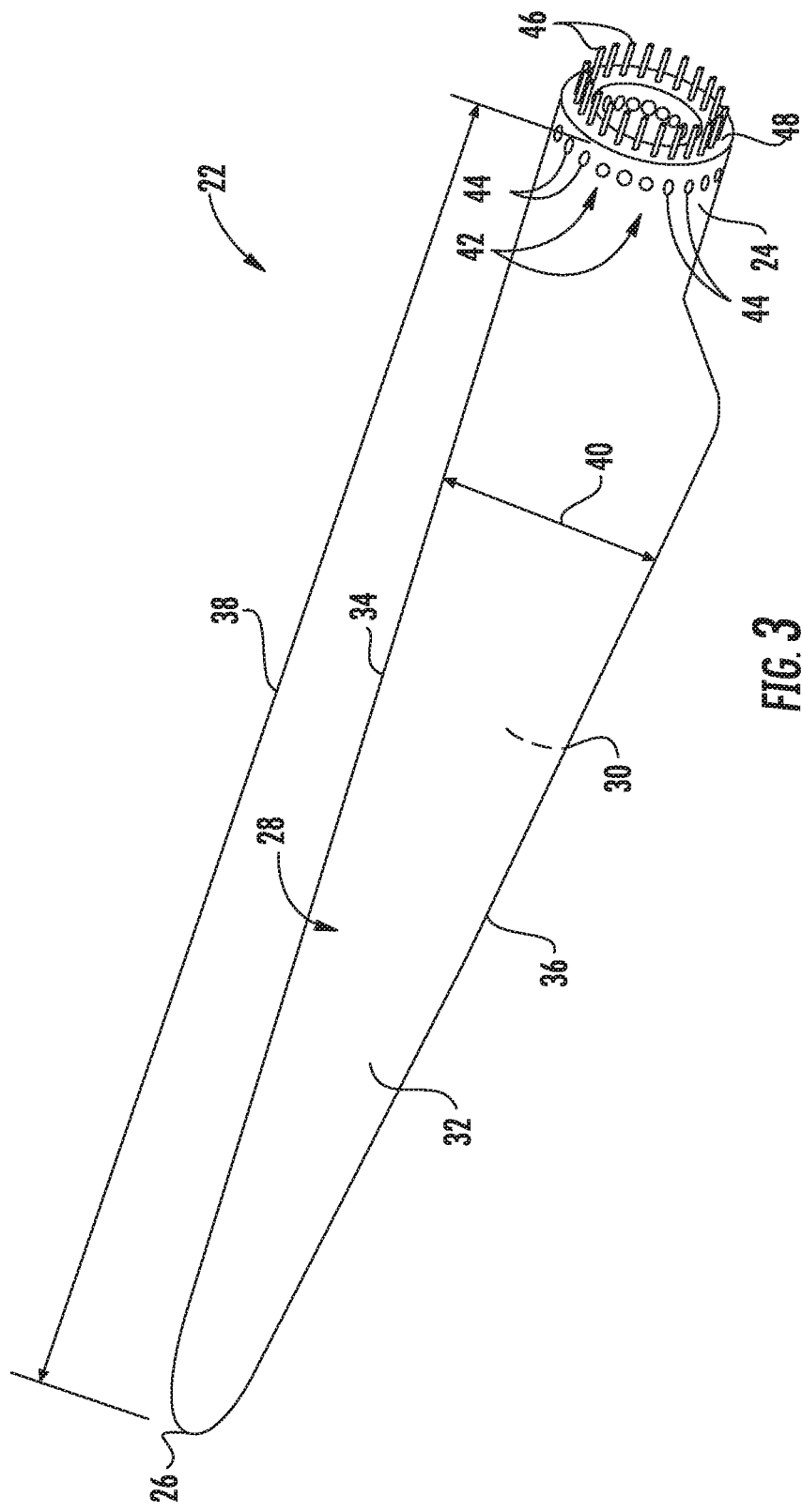
FIG. 3 illustrates a perspective view of a rotor blade according to one embodiment of the present disclosure.

Referring now to FIG. 3, a perspective view of one of the rotor blades 22 shown in FIG. 1 is illustrated in accordance with aspects of the present subject matter. As shown, the rotor blade 22 includes a blade root 24 configured for mounting the rotor blade 22 to the hub 20 of a wind turbine 10 (FIG. 1) and a blade tip 26 disposed opposite the blade root 24. A body 28 of the rotor blade 22 may extend lengthwise between the blade root 24 and the blade tip 26 and may generally serve as the outer shell of the rotor blade 22. As is generally understood, the body 28 may define an aerodynamic profile (e.g., by defining an airfoil shaped cross-section, such as a symmetrical or cambered airfoil-shaped cross-section) to enable the rotor blade 22 to capture kinetic energy from the wind using known aerodynamic principles. Thus, the body 28 may generally include a pressure side 30 and a suction side 32 extending between a leading edge 34 and a trailing edge 36. Additionally, the rotor blade 22 may have a span 38 defining the total length of the body 28 between the blade root 24 and the blade tip 26 and a chord 40 defining the total length of the body 28 between the leading edge 34 and the trailing edge 36. As is generally understood, the chord 40 may vary in length with respect to the span 38 as the body 29 extends from the blade root 24 to the blade tip 26.

Moreover, as shown in FIG. 2, the rotor blade 22 may also include a plurality of T-bolts or root attachment assemblies 42 for coupling the blade root 22 to the hub 20 of the wind turbine 10. In general, each root attachment assembly 42 may include a barrel nut 44 mounted within a portion of the blade root 24 and a hub bolt 46 coupled to and extending from the barrel nut 44 so as to project outwardly from a root end 48 of the blade root 24. By projecting outwardly from the root end 48, the hub bolts 46 may generally be used to couple the blade root 24 to the hub 20 via one of the pitch bearings 52 of the wind turbine 10. For example, the pitch bearing 52 may define a plurality of bolt holes configured to receive the hub bolts 48.

Various embodiments of methods for removing one of the rotor blades 22 from the hub 20 of the wind turbine 10, including various system components that may be used in performing such methods, will now be described with reference to FIGS. 3-13. More specifically, methods for removing and assembling the hardware associated with attaching the rotor blades 22 to the hub 20 of the wind turbine 10 when the hardware is located outside of the hub 20 and physical access is difficult are provided. Such methods, which are described in more below, may include options to partially remove hardware in an accessible orientation, removal of the hardware with a mechanical arm 74 that mounts externally or directly to the blade 22, and/or a support structure 90 that supports a person in the difficult access location to utilize current hand tools for removal of the hardware. It should be appreciated that, although the methods will generally be described with reference to removing a rotor blade 22 from the hub 20, the various method steps and system components disclosed herein may similarly be used to install a rotor blade 22 onto a wind turbine 10 by simply reversing the order in which the method is performed. It should also be appreciated that, although the methods will be described herein as being performed in a particular order, the methods may generally be performed in any suitable order that is consistent with the disclosure provided herein.

Figure 4:
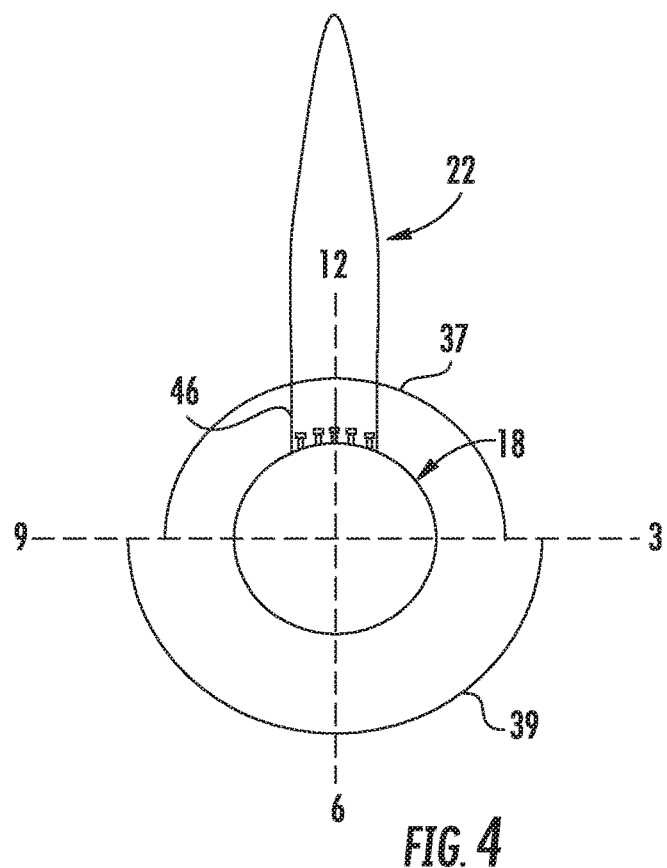
FIG. 4 illustrates a front view of one embodiment of a rotor of the wind turbine according to the present disclosure, particularly illustrating a rotor blade extending in a first position of the rotor.
Figure 5:
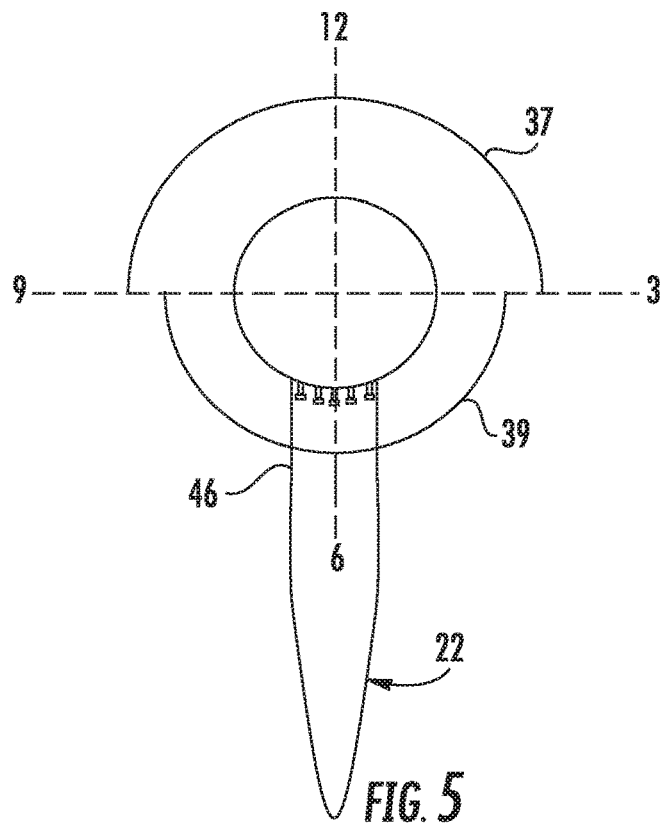
FIG. 5 illustrates a front view of one embodiment of a rotor of the wind turbine according to the present disclosure, particularly illustrating a rotor blade extending in a second position of the rotor.

Referring particularly to FIGS. 4 and 5, as mentioned, some of the hardware (i.e. the hub bolts 46 and associated nuts 53) may be removed while the rotor blade 22 is positioned in a first position 37 (FIG. 4) or a more accessible orientation than a second position (FIG. 5). For example, as shown in FIG. 4, the first position 37 may include rotor positions ranging from about a nine o'clock position to a twelve o'clock position to about a three o'clock position. As such, when the rotor blade 22 is in the first position 37, the hub bolts 46 are generally more accessible than the second position 39, which, as shown in FIG. 5, includes rotor positions ranging from about a three o'clock position to a six o'clock position to about a nine o'clock position. Thus, a first subset of the hub bolts 46 may be torqued and removed while the rotor blade 22 is in the first position 37. Due to the ease of access, in certain embodiments, the first subset of hub bolts 46 may be greater than (i.e. include more bolts) a second set of hub bolts 46 that are removed while the rotor blade 22 is in the second position 39.

More specifically, as shown in FIG. 5, after the first set of hub bolts 46 are removed, the rotor blade 22 may be rotated to the second position to remove the remaining bolts 46 (i.e. the second set of hub bolts 46). In other words, the method of hardware removal takes advantage of removing a majority of the bolts 46 while the hardware is easier to access, then changes the rotor position of the rotor blade 22 to a position corresponding to blade removal, after which, the remaining bolts 46 can be removed so as to detach the rotor blade 22 from the hub 20. Removal of the hardware when the rotor blade 22 is in the second position is discussed herein below. Further, it should also be understood that all of the hub bolts 46 may be removed while the rotor blade 22 is in the second position (rather than first removing some of the bolts 46 in the first position).

Figure 6:
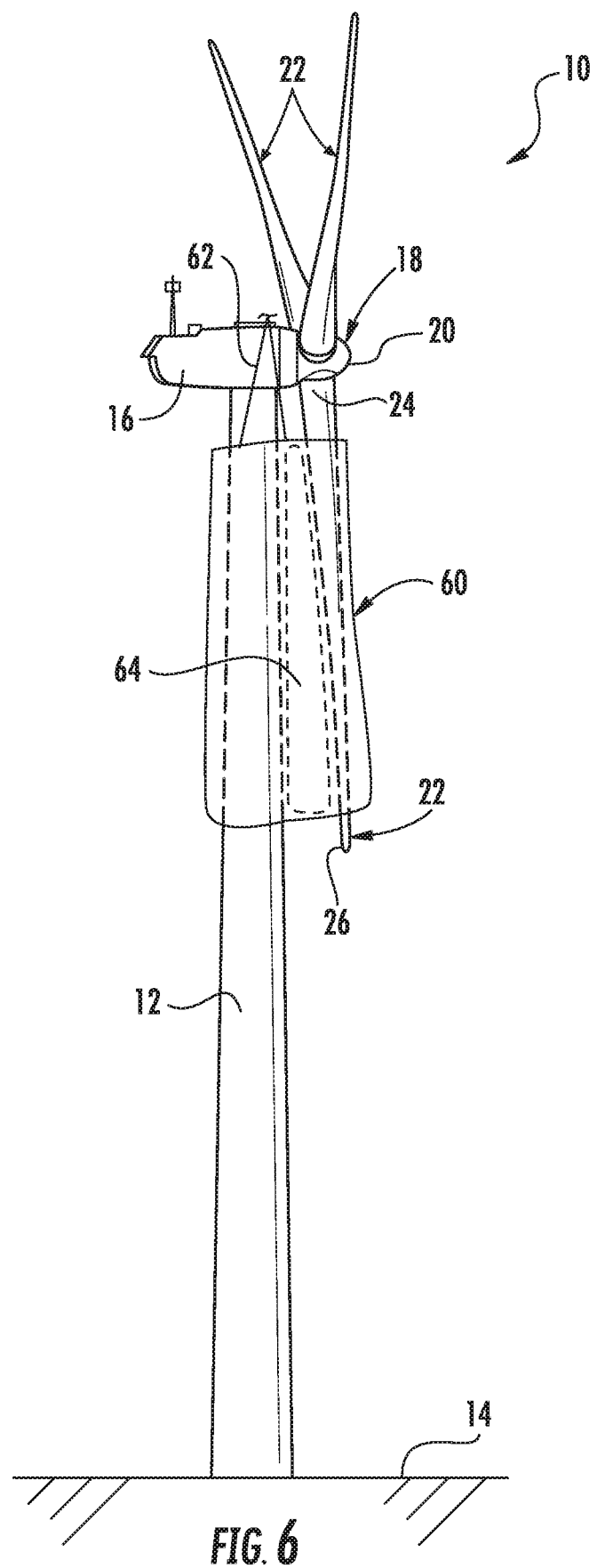
FIG. 6 illustrates a perspective view of one embodiment of a wind turbine, particularly illustrating one of the rotor blades secured to the tower via a single blade sleeve according to the present disclosure.

Referring particularly to FIG. 6, the rotor blade 22 to be removed is generally positioned in a vertical orientation relative to the support surface 14 of the wind turbine 10. More specifically, as shown, the rotor blade 22 is extending substantially (i.e. +/−10%) vertically downward from the hub 20 in approximately a six o'clock position such that the blade tip 26 of the rotor blade 22 is pointing towards the support surface 14. It should be appreciated that, due to a tilt angle and/or cone angle of the wind turbine 10, the rotor blade 22 may be angled slightly away from the tower 12 when moved to the vertically downward position. As mentioned, though such positions (i.e. between 3-6-9 o'clock) are beneficial in removing the rotor blade 22 from the hub 20 and lowering the blade 22 to the ground, such rotor positions can create difficulty for personnel to access hardware locations for detaching the rotor blade 22 from the hub 20. As such, the various embodiments provided herein describe methods for improving safety associated with removing such hardware when the blade is in a difficult-to-access position (also referred to herein as the second position 39).

In several embodiments, once the rotor blade 22 is rotated to the vertically downward position, the rotor blade 22 may optionally be secured to the tower 12 at the blade root 24 and the blade tip 26. More specifically, the rotor blade 22 may be secured to the tower 12 via a clamp, a sleeve, one or more support lines, or combinations thereof. For example, as shown in FIG. 6, the rotor blade 22 is secured to the tower 12 via an optional blade sleeve 60 that is held in place via support lines 62. More specifically, as shown, the blade sleeve 60 extends continuously between the blade root 24 and the blade tip 26. In alternative embodiments, as shown in FIG. 8, the rotor blade 22 may be secured to the tower 12 via one or more sleeves 60, i.e. one at the blade root 24 and one at the blade tip 26, rather than continuously from the blade root 24 to the blade tip 26.

Figure 7:
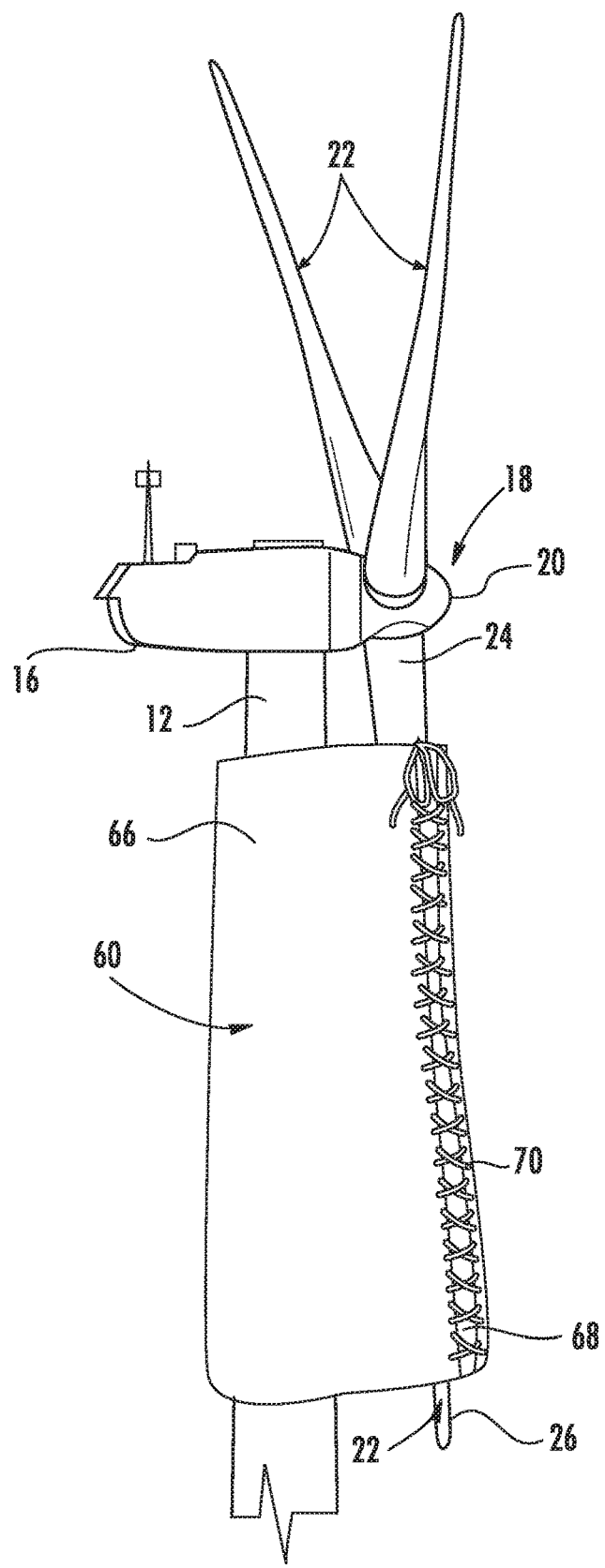
FIG. 7 illustrates a detailed, perspective view of the wind turbine of FIG. 6.
Figure 8:
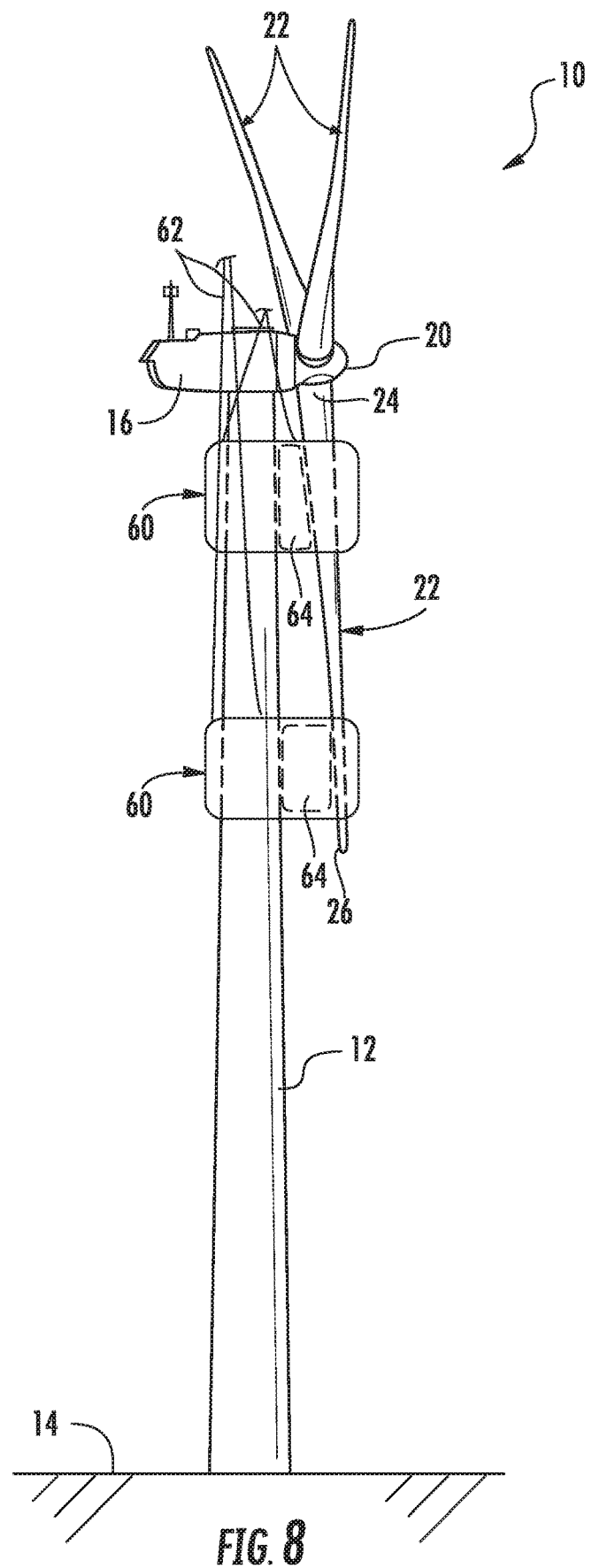
FIG. 8 illustrates a perspective view of another embodiment of a wind turbine, particularly illustrating one of the rotor blades secured to the tower via a plurality of blade sleeves according to the present disclosure.

Further, as shown in FIGS. 6-8, the blade sleeve 60 may be wrapped around the rotor blade 22 and the tower 12 so as to restrict movement of the rotor blade 22 during detachment of the blade root 24 of the rotor blade 22 from the hub 20. More specifically, as shown particularly in FIG. 7, the sleeve 60 may correspond to a fabric material 66 that is split along at least one split line 68 such that the material 66 can be easily wrapped around the rotor blade 22 and the tower 12 and then secured back together, e.g. via laces, buttons, a ratchet strap, an adhesive, tape, and/or a zipper). For example, as shown in FIG. 7, the fabric material 66 is secured around the rotor blade 22 via laces 70 configured along the split line 68 that are tied together.

In addition, as shown in FIGS. 6-8, the blade sleeve(s) 60 may house at least one cushion component 64 between the tower 12 and the rotor blade 22. Thus, as shown, the cushion component 64(s) may act as an airbag that is configured to conform to the rotor blade 22 and/or the tower 12 to provide support over a large surface area to prevent crushing of the rotor blade 22 and/or the tower 12.

Referring particularly to FIGS. 6 and 8, one or more support lines 62 may be secured to the blade sleeve(s) 60 and may extend upward to an up-tower location, such as at a location on and/or within the hub 20 or the nacelle 16. For instance, in one embodiment, the support line(s) 62 may extend upward from the blade sleeve(s) 60 to personnel located within and/or on top of the hub 20 or the nacelle 16. Regardless, the support line(s) 62 may be used to lift the blade sleeve(s) 60 vertically upwards relative to the support surface 14 to allow the sleeve 60 to be installed around the rotor blade 22 and the tower 12. It should also be understood by those of ordinary skill in the art that the system and method as described herein can operate without the use of the blade sleeve(s) 60.

Figure 9:
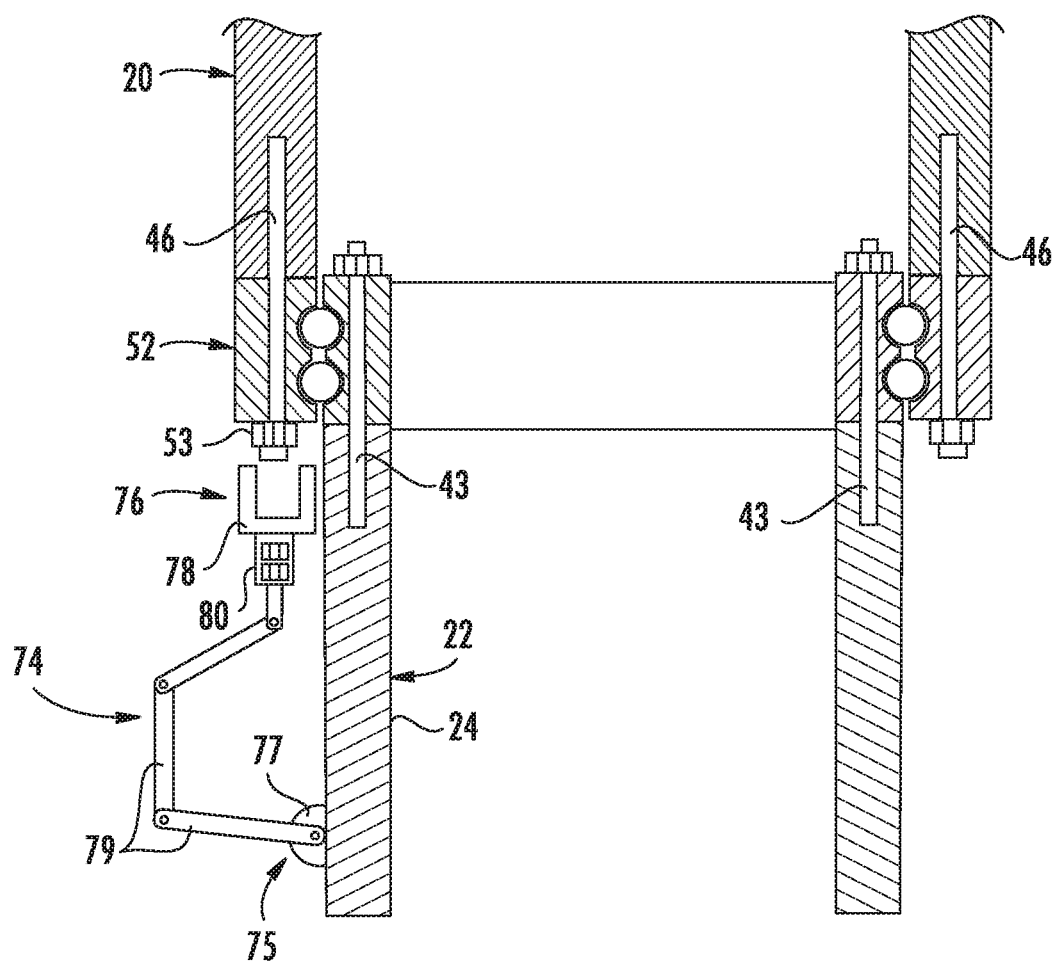
FIG. 9 illustrates one embodiment of a mechanical arm according to the present disclosure, particularly illustrating the automated being mounted to the blade root of the rotor blade.

Referring now to FIG. 9, to continue the removal process of the rotor blade 22, a mechanical arm 74 may be mounted to an uptower location of the wind turbine 10. More specifically, in several embodiments, the uptower location may include the blade root 24 of the rotor blade 22, the hub 20, the pitch bearing 52, an external support structure (e.g. a platform) mounted uptower, or any other suitable uptower structure. For example, as shown in the illustrated embodiment, the mechanical arm 74 is mounted to the blade root 24. It should be understood that the mechanical arm 74 may be mounted to the uptower location using any suitable means including but not limited to fasteners, fastening plates, tape, or adhesives. For example, as shown, a proximal end 75 of the mechanical arm 74 is secured to a fastening plate 77 that is mounted to the blade root 24 via a plurality of bolts (not shown).

Further, as shown, the mechanical arm 74 includes a torqueing tool 78 at a distal end 76 thereof. Thus, the torqueing tool 78 is configured to locate each of the hub bolts 46 via the mechanical arm 74 and torque each of the hub bolts 46, nuts, washers, and similar so as to loosen the rotor blade 22 from the hub 20. More specifically, the mechanical arm 74 as described herein may include any type of programmable automated or manual arm that can be manipulated to locate and remove the hub fasteners, particularly when such fasteners are located in difficult-to-access locations. In addition, as shown, the mechanical arm 74 may include one or more individual arms 79 joined together by joints that allow for easier movement of the arm 74.

Further, the mechanical arm 74 may include a computer or other suitable processing unit. Thus, in several embodiments, the computer may include suitable computer-readable instructions that, when implemented, configure the computer to perform various different functions, such as receiving, transmitting and/or executing control signals. As such, the mechanical arm 74 may be continuously adjusted via its computer to accommodate removal each of the hub bolts 46. For example, as shown, the individual arms 79 of the mechanical arm 74 may be hinged together so as to reach bolts 46 at different locations as commanded by its internal processor. In addition, the arms 79 may be extendable or telescopic. As such, the mechanical arm 74 can be mounted and/or adjusted so as to accommodate rotor blades and pitch bearings of varying sizes.

In additional embodiments, the torqueing tool 78 may be designed with a maximum height and/or diameter so as to ensure that the tool 78 can fit in predetermined clearances uptower. For example, in particular embodiments, the torqueing tool 78 may correspond to a ratcheting crow foot system, a wrench (such as a socket wrench), a screwdriver, or any other suitable tool capable of removing the hub bolts 46. As such, in certain embodiments, the torqueing tool 78 is configured to torque and remove the nuts 53 that are holding the hub bolts 46 in place and then optionally remove the hub bolts 46. In further embodiments, the torqueing tool 78 may also be configured to store the hardware such that the hardware does not fall to the ground. For example, as shown, the torqueing tool 78 may include a storage system 80 for storing the plurality of hub bolts 46 therein tool after removal. More specifically, the storage system 80 may be a nested storage system in the socket of the torqueing tool 78 (where applicable) or a bag or feed system.

In additional embodiments, the rotor blade 22 may be detached from the hub 20 with the pitch bearing 52 still attached thereto, e.g. via a plurality of blade bolts 43 (FIG. 9). In such embodiments, removal of the hardware expedites the pitch bearing replacement process because the rotor blade 22 and the pitch bearing 52 are detached at the same time and the bearing removal from the rotor blade 22 can occur on the ground, which is safer than uptower, as well as in parallel with the bearing installation process to the hub 20.

Figure 10:
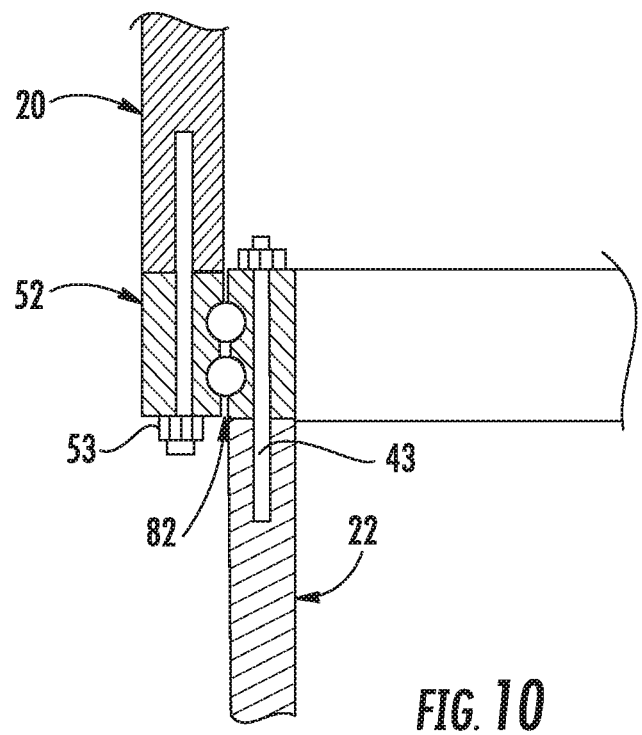
FIG. 10 illustrates a cross-sectional view of the rotor blade and the hub of the wind turbine connected together via a plurality of hub fasteners, particularly illustrating a tight clearance between the bolt hardware and the blade root of the rotor blade.
Figure 11:
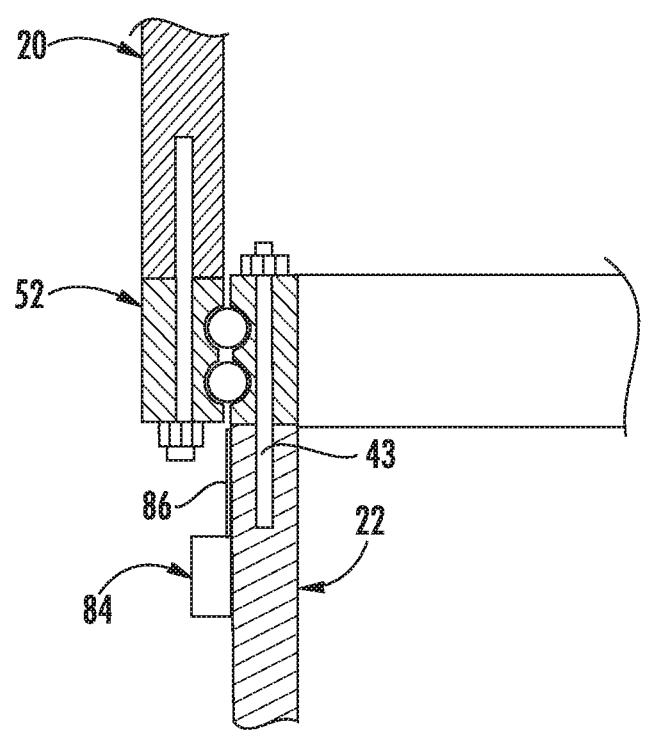
FIG. 11 illustrates a cross-sectional view of the embodiment of FIG. 10, particularly illustrating a material removal device configured within the tight clearance between the bolt hardware and the blade root of the rotor blade.

Referring now to FIG. 10, for several embodiments, some amount of uptower machining may be required to create space for the torqueing tool 78 to remove the hub bolts 46. For example, as shown at 82, the space between the hub bolt nut 53 and the blade root 24 may not be large enough to receive the torqueing tool 78. Therefore, as shown in FIG. 11, a material removal device 84 may be mounted to the blade root 24 (or any other suitable uptower location) so as to remove a portion of the blade root 24 to create space for the torqueing tool 78. More specifically, in such embodiments, the material removal device 84 may be mounted such a grinder portion 86 extends into the gap 82 such that the grinder portion 86 can remove material to create space for the torqueing tool 78.

The grinder portion 86 as described herein may be passive or active. For example, in one embodiment, where the grinder portion 86 is passive, the controller 35 is configured to pitch the rotor blade 22 via the pitch drive mechanism 45 such that rotation of the rotor blade 22 against the material removal device 84 removes the portion of the rotor blade 22. In such embodiments, material is removed from the blade root 24 in a cylindrical fashion. In alternative embodiments, where the grinder portion 86 is active, a portion of the blade root 24 may be removed via the material removal device 84 by grinding away material in the gap 82 via an electrically-driven grinder portion 86. In such embodiments, material may be removed from selected areas (i.e. just around the nuts 53) rather than in a cylindrical fashion. It should be understood that the material removal device 84 may be integrated into the torqueing tool 78 such that the rotor blade 22 does not have to pitch. Alternatively, as shown in FIG. 11, the material removal device 84 may be a separate tool.

Figure 12:
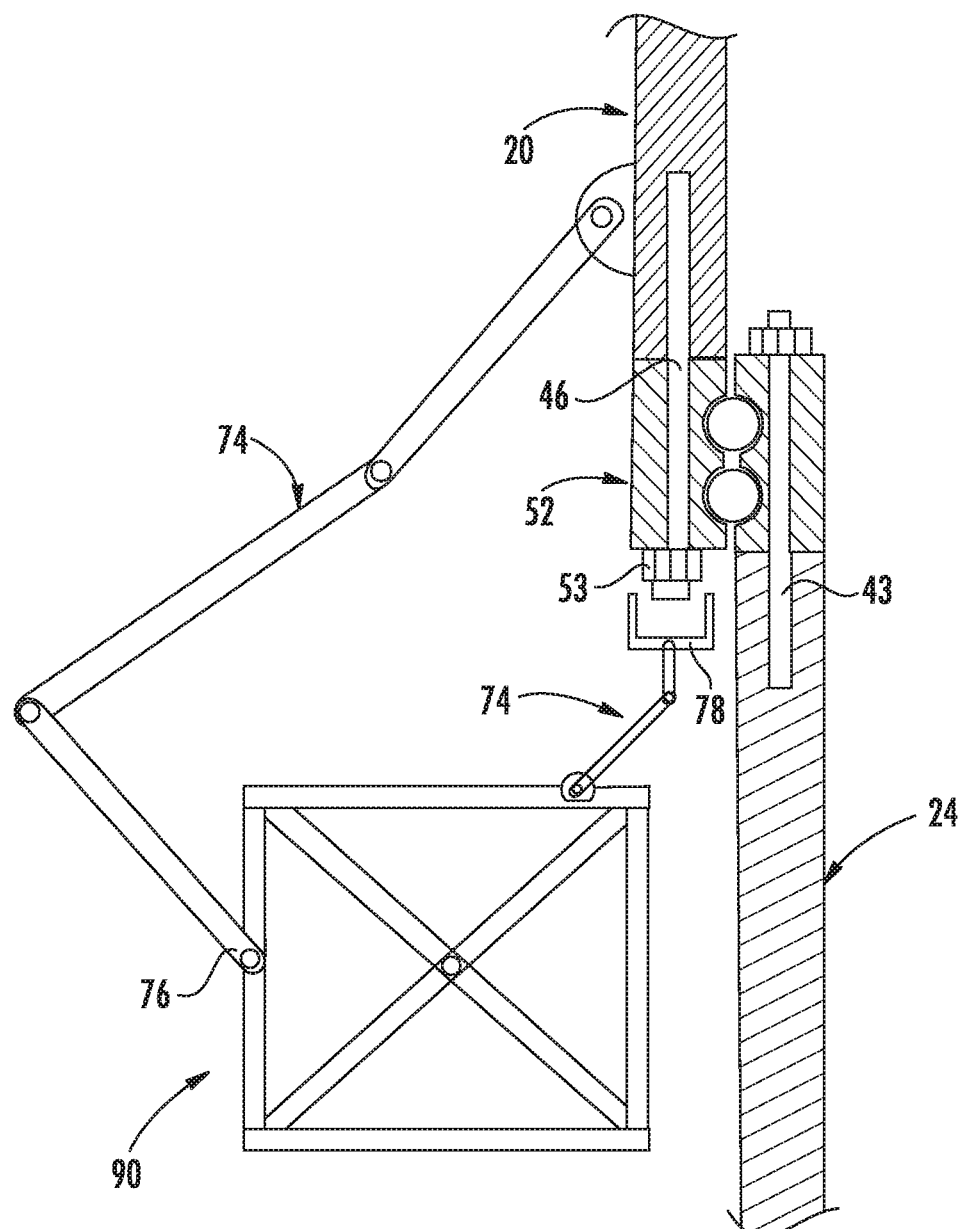
FIG. 12 illustrates another embodiment of the mechanical arm according to the present disclosure, particularly illustrating a support platform mounted to a distal end of the mechanical arm.

Referring now to FIG. 12, another embodiment of the mechanical arm(s) 74 of the present disclosure is illustrated. More specifically, as shown, a first mechanical arm 74 is mounted to the hub 20 of the wind turbine 10. Alternatively, as mentioned, the first mechanical arm 74 may be mounted at any suitable uptower location of the wind turbine 10. Further, as shown, a support platform 90 is mounted to the distal end 76 of the first mechanical arm 74. As such, the mechanical arm 74 can be maneuvered to a location near the plurality of hub bolts 46, thereby creating a safe surface for personnel to work from when removing the bolts 46. In such embodiments, personnel may use the torqueing tool 78 described herein as well as any other suitable tooling devices suitable for bolt removal. Alternatively, as shown, a second mechanical arm 74 may be mounted to the support platform 90 for removing the hub bolts 46.

Once the hardware is removed using the various methods as described herein relating the present disclosure, the rotor blade 22 (and optionally the pitch bearing 52) can be lowered to the ground using any suitable means known in the art.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for detaching or installing a rotor blade from or to a hub of a wind turbine, the method comprising:
    positioning the rotor blade toward a ground location between a three o'clock position and a nine o'clock position;
    mounting a mechanical arm to an uptower location of the wind turbine, the mechanical arm comprising a wrench at a distal end thereof, the mechanical arm comprising a plurality of arm members secured together via one or more hinges;
    removing, via a grinder, a portion of the rotor blade at a blade root of the rotor blade to create space for a wrench;
    locating the wrench adjacent to one of a plurality of hub fasteners where the portion of the rotor blade has been removed between the rotor blade and the hub by rotating one or more of the plurality of arm members of the mechanical arm about the one or more hinges, and,
    removing or installing, via the wrench, each of the plurality of hub fasteners so as to detach or attach the rotor blade from or to the hub.

2. The method of claim 1, wherein a pitch bearing is secured between the rotor blade and the hub, the plurality of hub fasteners extending through the pitch bearing, wherein removing or installing, via the wrench, the plurality of hub fasteners between the rotor blade and the hub so as to detach or attach the rotor blade from or to the hub further comprises:
    removing or installing, via the wrench, each of the plurality of hub fasteners from or to the pitch bearing so as to detach or install the rotor blade from the hub, wherein the pitch bearing is attached to the rotor blade via a plurality of blade bolts.

3. The method of claim 1, further comprising positioning the rotor blade in a six o'clock position.

4. The method of claim 1, wherein the uptower location comprises at least one of the blade root, the hub, a pitch bearing, or an external support structure mounted uptower.

5. The method of claim 1, further comprising storing the plurality of hub fasteners in a storage container configured with the wrench after removal.

6. The method of claim 1, wherein the wrench comprises a maximum height and/or diameter so as to ensure that the wrench can fit in predetermined clearances uptower.

7. The method of claim 1, wherein removing the portion of the rotor blade at the blade root via the grinder further comprises:
    mounting the grinder adjacent to and contacting the portion of the rotor blade to be removed; and, pitching the rotor blade via an existing pitch system such that rotation of the rotor blade against the grinder removes the portion of the rotor blade.

8. The method of claim 1, wherein removing the portion of the rotor blade at the blade root further comprises utilizing the grinder to remove select areas of the blade root.

9. The method of claim 4, further comprising securing the rotor blade to a tower of the wind turbine at the blade root and a blade tip of the rotor blade during removing or installing of each of the plurality of hub fasteners via at least one of a clamp, a sleeve, one or more support lines, or combinations thereof.

10. The method of claim 9, further comprising securing the rotor blade to the tower continuously between the blade root and the blade tip thereof during removing, installing, or storage of each of the plurality of hub fasteners.

11. The method of claim 1, further comprising continuously adjusting the mechanical arm to accommodate removal or installation of each of the plurality of hub fasteners.

* * * * *